US009429331B2

(12) United States Patent
Poon et al.

(10) Patent No.: US 9,429,331 B2
(45) Date of Patent: Aug. 30, 2016

(54) SYSTEM AND METHOD FOR HEATER POWER PRIORITIZATION AND DISTRIBUTION

(71) Applicant: SYMBOL TECHNOLOGIES, INC., Schaumburg, IL (US)

(72) Inventors: Chung Keung Poon, Scarborough (CA); Thomas Koch, Mississauga (CA); Armia N Nazeer, Markham (CA)

(73) Assignee: Symbol Technologies, LLC, Holtsville, NY (US)

( * ) Notice: Subject to any disclaimer, the term of this patent is extended or adjusted under 35 U.S.C. 154(b) by 442 days.

(21) Appl. No.: 14/132,609

(22) Filed: Dec. 18, 2013

(65) Prior Publication Data

US 2015/0167988 A1     Jun. 18, 2015

(51) Int. Cl.
*F24D 19/10* (2006.01)
*G05D 23/19* (2006.01)

(52) U.S. Cl.
CPC .......... *F24D 19/10* (2013.01); *G05D 23/1932* (2013.01)

(58) Field of Classification Search
None
See application file for complete search history.

(56) References Cited

U.S. PATENT DOCUMENTS

| | | | |
|---|---|---|---|
| 5,280,158 A | 1/1994 | Matava et al. | |
| 5,291,514 A * | 3/1994 | Heitmann | F27B 9/40 219/390 |
| 5,454,427 A | 10/1995 | Westbrooks, et al. | |
| 6,487,463 B1 | 11/2002 | Stepp, III | |
| 9,043,627 B2 * | 5/2015 | Culbert | G06F 1/20 713/300 |
| 2007/0082311 A1 * | 4/2007 | Yamaguchi | F26B 21/10 432/1 |
| 2008/0050491 A1 | 2/2008 | Ramus | |
| 2008/0101038 A1 | 5/2008 | Ali | |
| 2010/0167636 A1 | 7/2010 | Bhattacharya et al. | |
| 2012/0159200 A1 | 6/2012 | Ardron | |
| 2012/0179303 A1 | 7/2012 | Anderson et al. | |
| 2012/0311357 A1 | 12/2012 | Andrews | |
| 2012/0329410 A1 | 12/2012 | Balakrishnan et al. | |
| 2013/0091348 A1 | 4/2013 | Kwon et al. | |
| 2013/0120630 A1 | 5/2013 | Kim et al. | |

FOREIGN PATENT DOCUMENTS

WO     2008004112 A1     1/2008

* cited by examiner

*Primary Examiner* — Ryan Jarrett

(57) ABSTRACT

A heater management system provides heat to heated zones of a mobile unit. For each heated zone, the heater management system includes a heater driver and a sensor. The heater driver is controlled by a unique control channel that is configured to heat the heated zone. The sensor senses environmental data external and internal to the heated zone. The heater management system includes a memory storing a heater driver prioritization database. The heater management system includes a heater control logic unit programmed to receive periodic reports from each of the sensors, prioritize the heated zones by utilizing the heater driver database as a function of the periodic reports, and determine power to be provided to each of the heater drivers based on the prioritizing operation and a predetermined global power limitation.

18 Claims, 2 Drawing Sheets

SYSTEM AND METHOD FOR HEATER POWER PRIORITIZATION AND DISTRIBUTION

BACKGROUND OF THE INVENTION

A mobile unit (MU) may be used in a variety of different environments. The portability of the MU allows a user to operate the MU between these environments. When the MU is transitioned between environments having different temperatures, air conditions, etc. such as a hot environment and a cold environment, the components of the MU may be adversely affected. Specifically, the total humidity in the air is unable to be controlled and therefore, a worst case scenario is often the basis for the design of the MU. For example, in typical freezer applications, the amount of humidity in the environment within the freezer is dependent on the conditions at which the freezer operates while the amount of humidity in a warm environment external to the freezer is usually open and dependent on weather conditions. The temperature transition between the freezer environment and the warm environment may be between extremes such as −30° C. and +50° C. With the rapid change in external temperature, the resulting humidity and pressure changes may introduce the adverse effects to the components of the MU.

Condensation in the environment may inhibit a user from using the MU in an intended manner. For example, in a first scenario when the MU is transitioned from a cold environment to a warm environment with high humidity, condensation may result such that a display device is not visible or a scanning module is blocked. When the MU is subsequently moved into a cold environment again, the condensation may freeze that renders mechanical systems inoperable such as an input device (e.g., keypad). Furthermore, condensation on electrical components may cause corrosion and/or shorting and other premature failing situations.

One manner of addressing these conditions is to provide a heating system. A conventional heating system provides heat to the components of the MU. The heat of the components may, for example, remove any condensation that forms. One issue with the conventional heating system is that the MU often has a large thermal mass such that a temperature transition affects some areas of the MU more than others. For example, the internal components of the MU may slowly transition in temperature while external components follow ambient temperature changes more closely. Furthermore, there are crucial areas within the MU that require heat more urgently than others such as clearing a display device over a keypad. In addition, the conventional heating system draws significant amounts of power from a limited power supply. Thus, if the heating system is given a priority to heat the components, the remaining amount of power limit available for utilizing the components themselves may be relatively small. As the MUs are often handheld by the user, safety limitations must also be considered when utilizing the heating system.

Accordingly, there is a need for a heating system in a MU that most efficiently provides heat to different components of the MU while also utilizing an available power supply efficiently.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
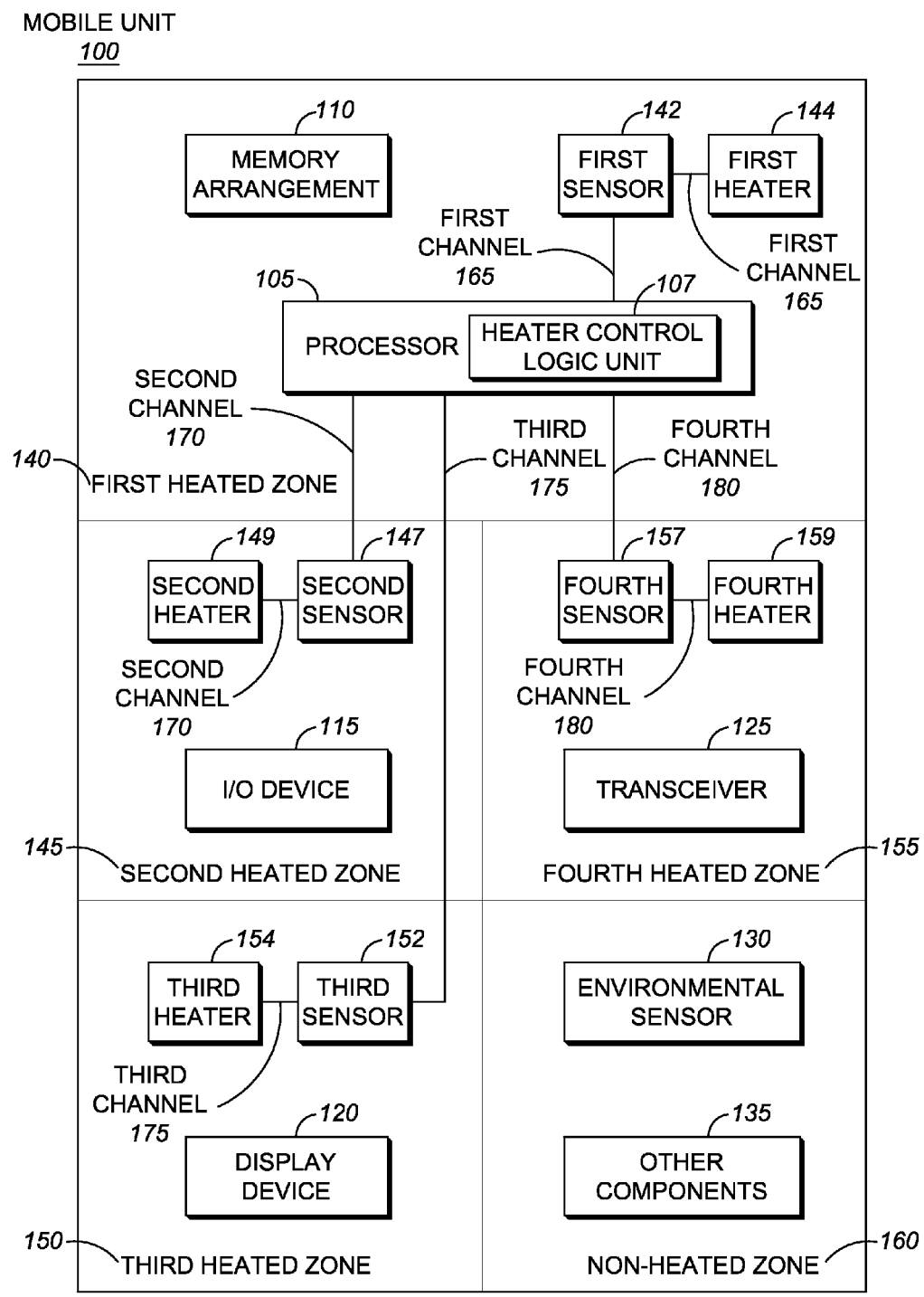
FIG. 1 illustrates a mobile unit including a heater control logic (HCL) unit in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention relates to a heater management system for a mobile unit (MU) where the MU includes a plurality of heated zones. The heater management system comprises a heater driver and a sensor for each of the heated zones. The heater driver is controlled by a unique control channel that is configured to heat the heated zone and the sensor senses environmental data external and internal to the heated zone. The heater management system comprises a memory storing a heater driver prioritization database. The heater management system comprises a heater control logic unit programmed to receive periodic reports from each of the sensors, prioritize the heated zones by utilizing the heater driver database as a function of the periodic reports, and determine power to be provided to each of the heater drivers based on the prioritizing operation and a predetermined global power limitation.

The exemplary embodiments may be further understood with reference to the following description and the appended drawings, wherein like elements are referred to with the same reference numerals. The exemplary embodiments describe a system and method for heater power prioritization and distribution. Specifically, a mobile unit (MU) includes a heating system that determines a priority order to provide power to a plurality of heaters for respective designated zones of the MU based upon environmental and temperature parameters. The heating system utilizes a heater control logic (HCL) unit that receives the environmental and temperature parameters to determine the priority order. The heating system also manages the power distribution to the heaters such that a desired temperature is maintained for the components of the MU without exceeding a global power limitation as well as remaining within predetermined safety limitations. The MU, the heating system, the priority order, the parameters, the HCL unit, the global power limitation, the predetermined safety limitations, and a related method will be discussed in further detail below.

The MU may be utilized in a manner that transitions between various temperature environments. When transitioning from a first environment to a second environment, the MU may experience effects from the transition such as the formation of condensation and subsequent effects of the condensation. Depending on various environmental and temperature parameters of the components of the MU, a heating system according to the exemplary embodiments determine a manner in which these components of the MU are to maintain a desired temperature to provide an optimal operating state of the MU. While maintaining the desired temperature for each of the components of the MU, the heating system also considers global requirements and design constraints as well as remaining within prescribed safety limitations.

FIG. 1 illustrates a mobile unit (MU) 100 including a HCL unit 107 in accordance with some embodiments. The MU 100 may include a plurality of conventional components. For example, the MU 100 may include a plurality of electronic components such as a processor 105, a memory arrangement 110, an input/output (I/O) device 115, a display device 120, a transceiver 125, an environmental sensor 130, and other components 135 such as a portable power supply, an audio input component, an audio output component, etc. The MU 100 may be any portable electronic device that may be moved from one environment to a different environment. For example, the MU 100 may be a laptop computer, a cellular telephone, a mobile telephone, a smart telephone, a personal digital assistant, a tablet computer, a barcode scanner, and the like.

The processor 105 may be configured to execute a plurality of applications. For example, the processor 105 may execute a browser application in which the data mode is utilized such that data is transmitted and received through a network via the transceiver 125. According to the exemplary embodiments, the HCL unit 107 may be an application that is executed by the processor 105. The HCL unit 107 may control a heater system of the MU 100 and management of components of the heater system. The HCL unit 107 may be stored in the memory arrangement 110 as a program such that the processor 105 may execute it. In this manner and as will be described in further detail below, the components of the heating system of the MU 100 may have a communication link with the processor 105. However, it should be noted that the HCL unit 107 being an application executed by the processor 105 or stored in the memory arrangement 110 is only exemplary. In another configuration, the HCL unit 107 may be a separate component of the MU 100. For example, the HCL unit 107 may be an incorporated component of the MU 100 including its own sub-components such as a respective processing unit and a respective storage unit to perform its functionality. In another example, the HCL unit 107 may be a modular component that couples to the MU 100 such that the functionality of the HCL unit 107 may be provided.

The I/O device 115 may be any component configured to receive a user input as well as generate corresponding data as an output. For example, the I/O device may be a touchpad or a keyboard for the user to provide an input in which corresponding data to the input is, for example, shown on the display device 120. The I/O device 115 may be partially disposed in a housing of the MU 100 such that keys are exposed to an exterior of the housing that enables the user to provide the user inputs. The display device 120 may be any component configured to show data to a user. For example, the display device 120 may be a liquid crystal display (LCD). When the I/O device 115 is integrated with the display device 120, the MU 100 may also include a touch screen. It should be noted that the MU 100 may include internal communication paths (not shown) for the various components to be communicatively coupled to each other as is well known in the art. For example, the processor 105 may be connected to each of the memory arrangement 110, the I/O device 115, the display device 120, the transceiver 125, the environmental sensor 130, and the other components 135 via these internal communication paths.

As illustrated, the MU 100 may include a plurality of heated zones. Specifically, the MU 100 may include a first heated zone 140, a second heated zone 145, a third heated zone 150, and a fourth heated zone 155. The first heated zone 140, the second heated zone 145, the third heated zone 150, and the fourth heated zone 155 may be designated based upon a variety of factors. For example, the capabilities of a heating unit within the heated zone may indicate a size of the heated zone. Within each heated zone, at least one of the above noted components may be associated therewith. For example, in the first heated zone 140, the processor 105 and the memory arrangement 110 may be disposed therein; in the second heated zone 145, the I/O device 115 may be disposed therein; in the third heated zone 150, the display device 120 may be disposed therein; and in the fourth heated zone 155, the transceiver 125 may be disposed therein. It should be noted that if the MU 100 includes a touch screen without a separate I/O device, a common heated zone may be used for the I/O device 115 and the display device 120.

It should be noted that FIG. 1 shows the components of the MU 100 in a constructive manner. Those skilled in the art will understand that the components may be separate as shown or may be integrated in some manner. For example, the processor 105, the memory 110, and the transceiver 125 may be integrated into a printed circuit board (PCB). Depending on a size of the PCB, a heated zone may be designated for an entirety of the PCB or multiple heated zones may be designated for portions of the PCB. Those skilled in the art will understand that the exemplary embodiments described herein may be adapted for this type of configuration as well.

According to the exemplary embodiments, the first heated zone 140, the second heated zone 145, the third heated zone 150, and the fourth heated zone 155 may each include a respective sensor and heater. As illustrated, the first heated zone 140 includes a first sensor 142 and a first heater 144; the second heated zone 145 includes a second sensor 147 and a second heater 149; the third heated zone 150 includes a third sensor 152 and a third heater 154; and the fourth heated zone 155 includes a fourth sensor 157 and a fourth heater 159. The control of the first heater 144, the second heater 149, the third heater 154, and the fourth heater 159 may be performed via the HCL unit 107. Specifically, the HCL unit 107 determines an amount of power to be provided to the first heater 144, the second heater 149, the third heater 154, and the fourth heater 159. Accordingly, a dedicated channel may be associated for each heated zone and its respective heater such that feedback control and power may be provided through the channel to the heater to control the temperature of the heated zone. Therefore, power may be drawn from the portable power supply, through the respective channel, and to the respective heater. As illustrated, the first heated zone 140 and the first heater 144 may utilize a first channel 165; the second heated zone 145 and the second heater 149 may utilize a second channel 170; the third heated zone 150 and the third heater 154 may utilize a third channel 175; and the fourth heated zone 155 and the fourth heater 159 may utilize a fourth channel 180. As the channels are used to provide the power and feedback control, each heater and heated zone may have a connection (not shown) to the portable power supply of the MU 100 from which the power is drawn.

The first heater 144, the second heater 149, the third heater 154, and the fourth heater 159 may each include a heater driver connected to the HCL unit 107 via the first channel 165, the second channel 170, the third channel 175, and the fourth channel 180, respectively. The heater driver may be controlled via the channel to draw a predetermined amount of power from the portable power supply. For example, if a heated zone is determined to require a larger increase in temperature, the heater may be provided an increased power. In another example, if a heated zone is determine to have reached a desired temperature and this desired temperature is to be maintained, the heater may be provided a lesser amount of power.

The first channel 165, the second channel 170, the third channel 175, and the fourth channel 180 may each include the first sensor 142, the second sensor 147, the third sensor 152, the fourth sensor 157, respectively. Specifically, as shown in FIG. 1, the first sensor 142 may be incorporated in the first channel 165 and positioned between the processor 105 and the first heater 144; the second sensor 147 may be incorporated in the second channel 170 and positioned between the processor 105 and the second heater 149; the third sensor 152 may be incorporated in the third channel 175 and positioned between the processor 105 and the third heater 154; and the fourth sensor 157 may be incorporated in the fourth channel 180 and positioned between the processor 105 and the fourth heater 159. The first sensor 142, the second sensor 147, the third sensor 152, and the fourth sensor 157 may provide individual environmental zone conditions. For example, the first sensor 142 may determine the temperature of the first heated zone 140; the second sensor 147 may determine the temperature of the second heated zone 145; the third sensor 152 may determine the temperature of the third heated zone 150; and the fourth sensor 157 may determine the temperature of the fourth heated zone 155. The first sensor 142, the second sensor 147, the third sensor 152, and the fourth sensor 157 may also determine other environmental data such as a humidity condition. As discussed above, the first channel 165, the second channel 170, the third channel 175, and the fourth channel 180 provide a feedback control in which information from the first sensor 142, the second sensor 147, the third sensor 152, and the fourth sensor 157 generates this data for the HCL unit 107 and provided via the respective channel. The environmental data of the heated zones generated by the sensors may be provided to the HCL unit 107 on a variety of bases. For example, the data may be provided continuously, periodically, when requested, or any combination of these. The first sensor 142, the second sensor 147, the third sensor 152, and the fourth sensor 157 may also determine external environmental data related to the first heated zone 140, the second heated zone 145, the third heated zone 150, and the fourth heated zone 155, respectively. For example, a portion of each of the first sensor 142, the second sensor 147, the third sensor 152, and the fourth sensor 157 may be exposed to an exterior of the MU 100 such that the external environmental data may be generated. This data may also be provided to the HCL unit 107. As discussed above, the first channel 165, the second channel 170, the third channel 175, and the fourth channel 180 may provide the feedback control in which this data may be forwarded to the HCL unit 107. It should be noted that the environmental sensor 130 may also be included to generate the environmental data of the MU 100. Accordingly, the conditions of the environment in which the MU 100 is disposed may be generated by the environmental sensor 130 to be provided to the HCL unit 107. In such an embodiment, the first sensor 142, the second sensor 147, the third sensor 152, and the fourth sensor 157 may be configured to only generate the internal environmental data of the first heated zone 140, the second heated zone 145, the third heated zone 150, and the fourth heated zone 155, respectively.

The HCL unit 107 may receive the internal environmental data from the first sensor 142, the second sensor 147, the third sensor 152, and the fourth sensor 157 related to the first heated zone 140, the second heated zone 145, the third heated zone 150, and the fourth heated zone 155, respectively. It should be noted that the first sensor 142, the second sensor 147, the third sensor 152, and the fourth sensor 157 may operate in different manners such as all operating concurrently, only one operating at a time, or select ones operating concurrently while remaining ones are inactive. Upon receiving this data, the HCL unit 107 may utilize this data as a basis to determine a heater driver prioritization order. That is, the HCL unit 107 may determine an order in which the heater driver for the first heater 144, the second heater 149, the third heater 154, and the fourth heater 159 are to be utilized in order to reach a desired temperature for the first heated zone 140, the second heated zone 145, the third heated zone 150, and the fourth heated zone 155, respectively. It should be noted that each of the first heated zone 140, the second heated zone 145, the third heated zone 150, and the fourth heated zone 155 may have a common desired temperature or may have different desired temperatures. The desired temperature for the first heated zone 140, the second heated zone 145, the third heated zone 150, and the fourth heated zone 155 may relate to a temperature at which the components disposed therein operate in an optimal manner. Accordingly, the desired temperature for each of the first heated zone 140, the second heated zone 145, the third heated zone 150, and the fourth heated zone 155 may also be utilized as another basis to determine the heater prioritization order.

The internal environmental data may be used to determine an adjustment of conditions within the first heated zone 140, the second heated zone 145, the third heated zone 150, and the fourth heated zone 155 such that the components thereof may operate or operate most optimally. For example, when the MU 100 is disposed in a warm, humid environment, condensation may form on the display device 120, specifically on an external surface thereof (particularly if the MU 100 was moved from a cold, dry environment). Furthermore, as the MU 100 may be in this warm, humid environment for a particular length of time, condensation may also form within the housing of the MU 100. In addition, eventually, the components within the housing of the MU 100 may reach the temperature of the warm environment. Those skilled in the art will understand that the warm environment may have a temperature condition that is within an optimal temperature range of operation for the components of the MU 100. If the MU 100 is then moved to a cold environment, the condensation within the housing of the MU 100 may freeze as well as a temperature of the components of the MU 100 to drop. The internal environmental data may be used by the HCL unit 107 to determine an amount of power required for the first heater 144, the second heater 149, the third heater 154, and the fourth heater 159 such that a desired temperature (e.g., a lowest temperature in the optimal temperature range) is reached and/or the condensation in the first heated zone 140, the second heated zone 145, the third heated zone 150, and the fourth heated zone 155 does not create an adverse effect to the components of the MU 100.

The HCL unit 107 may also receive the external environmental data from each of the first sensor 142, the second sensor 147, the third sensor 152, and the fourth sensor 157 and/or the environmental sensor 130. Upon receiving this data, the HCL unit 107 may utilize this data as a further basis to determine the heater driver prioritization order. Using the above described example, the external environmental data may be used such that the HCL unit 107 becomes aware of the change in temperature, humidity, etc. from a previous condition. Thus, the HCL unit 107 may determine that the MU 100 has moved from a warm, humid environment to a cold environment based upon the external environmental data. An opposite scenario may also be determined by the HCL unit 107 based upon the external environmental data. Using this further input, the HCL unit 107 may determine the amount of power required for the first heater 144, the second heater 149, the third heater 154, and the fourth heater 159 such that the desired temperature is reached and/or prevent condensation forming within the MU 100. Accordingly, the HCL unit 107 may utilize the internal and external environmental data to provide power to the first heated zone 140, the second heated zone 145, the third heated zone 150, and the fourth heated zone 155 to counteract any existing conditions (e.g., condensation that has already formed) and/or may provide power to the first heated zone 140, the second heated zone 145, the third heated zone 150, and the fourth heated zone 155 to prevent a condition from occurring (e.g., condensation from forming). It should be noted that the internal and external environmental data may be generated by the first sensor 142, the second sensor 147, the third sensor 152, and the fourth sensor 157 and/or the environmental sensor 130 and stored in the memory arrangement 110 at different times. For example, the sensors may generate first environmental data that is indicative of the MU 100 at a first point in time and stored in the memory arrangement 110. Subsequently, the sensors may generate second environmental data that is indicative of the MU 100 at a second point in time and stored in the memory arrangement 110. The HCL unit 107 may use the first and second environmental data to determine whether a change has occurred that indicates a change in the temperature, humidity, etc. In a specific example, the first and second environmental data may indicate that the MU 100 has moved from a hot environment to a cold environment such that the HCL unit 107 determines a change in temperature, thereby determining power to be provided to the heaters. In another specific example, the first and second environmental data may indicate that the MU 100 has moved from a warm, humid environment to a cold, dry environment such that the HCL unit 107 determines a change in humidity, thereby determining power to be provided to the heaters. The first, second, and further environmental data may be generated and stored in the memory arrangement 110 in a continuous manner, at predetermined times, when required, or a combination of these.

The HCL unit 107 may determine the heater driver prioritization order in a variety of manners. Specifically, the first channel 165, the second channel 170, the third channel 175, and the fourth channel 180 may all have settings parameterized in order to allow fine adjustment of a heating profile of the first heated zone 140, the second heated zone 145, the third heated zone 150, and the fourth heated zone 155 based upon the feedback from the first sensor 142, the second sensor 147, the third sensor 152, and the fourth sensor 157, respectively, that may be used to generate predetermined conditions. In a first example, a plurality of different heater driver prioritization orders may be stored in a heater driver prioritization database in the memory arrangement 110. Accordingly, the HCL unit 107 may utilize the heater driver prioritization database as a reference to determine the heater driver prioritization order based upon the internal and external environmental data that is generated by the environmental sensor 130, the first sensor 142, the second sensor 147, the third sensor 152, and the fourth sensor 157. In a second example, the HCL unit 107 may be configured with intelligence to determine the heater driver prioritization database upon receiving the internal and external environmental data. That is, the HCL unit 107 may determine the heater prioritization database in a dynamic manner without a predetermined order being provided.

The heater driver prioritization order may be determined in a variety of manners as well. In a first example, a user may define which components of the MU 100 are to take priority. In a second example, the HCL unit 107 may be preconfigured with which components of the MU 100 are to take priority. For example, in an exemplary embodiment in which the MU 100 transitions from a warm, humid environment to a cold environment (i.e., parameters determined via the internal and external environmental data), the heater driver prioritization order may be that the display device 120 is to have a first priority, the I/O device 115 is to have a second priority, the processor 105 is to have a third priority, and the transceiver 125 is to have a fourth priority. Accordingly, the HCL unit 107 may provide power to the third heater 154 of the third heated zone 150 first, provide power to the second heater 149 of the second heated zone 145 second, provide power to the first heater 144 of the first heated zone 140 third, and provide power to the fourth heater 159 of the fourth heated zone 155 fourth. In a further exemplary embodiment in which the MU 100 transitions from a cold environment to a warm environment, the heater driver prioritization order may be different such as the I/O device 115 first, the display device 120 second, the transceiver 125 third, and the processor 105 fourth. In this manner, the HCL unit 107 may dynamically provide power to the each of the first heater 144, the second heater 149, the third heater 154, and the fourth heater 159 of the first heated zone 140, the second heated zone 145, the third heated zone 150, and the fourth heated zone 155, respectively, in order to reach a desired temperature based upon the internal and external environmental data generated by the environmental sensor 130, the first sensor 142, the second sensor 147, the third sensor 152, and the fourth sensor 157.

As discussed above, the desired temperature of the first heated zone 140, the second heated zone 145, the third heated zone 150, and the fourth heated zone 155 may be the same or different. The desired temperature of the first heated zone 140, the second heated zone 145, the third heated zone 150, and the fourth heated zone 155 may also depend on a variety of factors. Initially, it is noted that the desired temperature may be a single value or may be a range of values. The HCL unit 107 may be configured such that the first heated zone 140, the second heated zone 145, the third heated zone 150, and the fourth heated zone 155 reach its target desired temperature or be within the range of desired, acceptable temperatures. Furthermore, the desired temperature of the first heated zone 140, the second heated zone 145, the third heated zone 150, and the fourth heated zone 155 may also be different based upon the internal and external environmental data. For example, when in a cold environment, the desired temperature may be lower than when in a warm environment. However, this lower desired temperature is still based upon how the components in the heated zone are to operate in a proper manner as well as not causing damage to the components. It is noted that when multiple components are disposed within a common heated zone, the HCL unit 107 may consider the desired temperature of this common heated zone based upon all associated components. For example, the heated zone 140 includes the processor 105 and the memory arrangement 110. Thus, the desired temperature may relate to a determination for both the processor 105 and the memory arrangement 110 to operate properly. However, it should also be noted that if the heated zone including multiple components is only considering a particular component, then the HCL unit 107 may determine the desired temperature based upon this particular component. It is also noted that the desired temperature of the components may be different beyond the internal and external environmental data. For example, the manufacturer of the component, the design of the component, the relative position to other heated zones, etc. may also be considered in determining or providing the desired temperature. The different desired temperatures for the first heated zone 140, the second heated zone 145, the third heated zone 150, and the fourth heated zone 155 based upon the internal and external environmental data may also be stored in the heater driver prioritization database stored in the memory arrangement 110.

The HCL unit 107 may also be configured to maintain the desired temperature of the first heated zone 140, the second heated zone 145, the third heated zone 150, and the fourth heated zone 155. According to the exemplary embodiments, the HCL unit 107 may provide power to the first heater 144, the second heater 149, the third heater 154, and the fourth heater 159 as determined by the heater driver prioritization order. For example, the third heater 154 may be provided power first, the second heater 149 may be provided power second, the first heater 144 may be provided power third, and the fourth heater 159 may be provided power fourth. The third heater 154 may be provided power first such that a maximum amount of dedicated power (e.g., a global power limitation from the portable power supply of the heating system that is reserved solely for the heating system) may be used. Once the third heated zone 150 has reached its desired temperature, the HCL unit 107 may provide power to the second heater 149 such that the desired temperature of the second heated zone 145 may be reached. However, during this phase, the HCL unit 107 may still reserve a portion of the dedicated power to be provided to the third heater 154. For example, upon receiving internal and external environmental data for the third heated zone 150, the HCL unit 107 may determine that the third heated zone 150 has deviated after reaching its desired temperature. Thus, the portion of the dedicated power to the third heater 154 may maintain the desired temperature for the third heated zone 150. Consequently, when the HCL unit 107 is providing power to the first heater 144 and then the fourth heater 159, a substantially similar process may be used to maintain the desired temperature of all previous heated zones that had its respective heater provided with power. For example, when the fourth heater 159 is provided power, the first heater 144, the second heater 149, and the third heater 154 may be provided some portion of the dedicated power to maintain the desired temperature of the first heated zone 140, the second heated zone 145, and the third heated zone 150, respectively.

The HCL unit 107 may determine how a dedicated power for the heating system may be utilized on a variety of factors. In a first example, the total available dedicated power may be predetermined such as from an administrator of the HCL unit 107. For example, the HCL unit 107 may be allowed to draw a total of 20 watts (W) of power from the portable power supply (not shown) for the first heater 144, the second heater 149, the third heater 154, and the fourth heater 159.

As discussed above, when the third heater 154 as indicated by the heater driver prioritization order is being provided power, the entirety of the 20 W may be used. When the second heater 149 as indicated by the heater driver prioritization order is being provided power (after the third heated zone 150 has reached its desired temperature), a lesser amount of power may be used as a portion is still used to maintain the desired temperature of the third heated zone 150 via the third heater 154. In a second example, the total available dedicated power for the HCL unit 107 may be determined in a dynamic manner. For example, the total available power of the portable power supply may indicate a value of the total available dedicated power for use by the HCL unit 107. In a particular example, the HCL unit 107 may be configured to only draw a certain percentage of the total available power of the portable power supply. Therefore, as the power of the portable power supply is used, the total available power may decrease. The HCL unit 107 may be configured to only draw the percentage to which the heating system is allotted.

The HCL unit 107 may utilize its allotted dedicated power for the first heater 144, the second heater 149, the third heater 154, and the fourth heater 159 such that a total amount of power used thereby does not exceed the predetermined amount. That is, the HCL unit 107 may employ the different heater profiles of the first heated zone 140, the second heated zone 145, the third heated zone 150, and the fourth heated zone 155 indicated in the heater driver prioritization database based upon the scenarios as determined based upon the internal and external environmental data in an intelligent manner to optimize heater power utilization. Specifically, a channel having a higher priority may receive more power than other channels. This may ensure that the maximum concurrent power budget is never violated as well as the overall power usage being controlled. For example, with a total dedicated power of 20 W, the third channel 175 may be provided 5 W of power to maintain the desired temperature of the third heated zone 150 after the third heated zone 150 has initially reached its desired temperature; the second channel 170 may be provided 2 W of power to maintain the desired temperature of the second heated zone 145 after the second heated zone 145 has initially reached its desired temperature; and the first channel 165 may be provided the remaining 13 W of power to reach the desired temperature of the first heated zone 140. In this manner, the total power budget of 20 W is never exceeded while the higher priority heated zones reach and maintain their desired temperatures. However, during the course of reaching the desired temperature of the first heated zone 140, the internal and external environmental data may indicate that the external temperature has dropped further such that the second heated zone 145 and the third heated zone 150 have deviated from their desired temperatures. The HCL unit 107 may initially provide the total dedicated power of 20 W to the third heater 154 in order for the third heated zone 150 to reach its desired temperature again as this has the highest priority. The HCL unit 107 may also determine that 6 W of power is required to maintain the desired temperature of the third heated zone 150 given the updated internal and external environmental data. Subsequently, the remaining 14 W of power may be provided to the second heater 149 such that the second heated zone 145 reaches its desired temperature. The HCL unit 107 may also determine that 3 W of power is required to maintain the desired temperature of the second heated zone 145 given the updated internal and external environmental data. Finally, the first heater 144 may receive the remaining 11 W of power (which is less than the original amount of 13 W) to continue to reach the desired temperature of the first heated zone 140.

During the course of reaching and maintaining the desired temperatures of various heated zones, the HCL unit 107 may determine that the total amount of power necessary to maintain the desired temperature of the heated zones goes beyond the total dedicated power. For example, if the first heated zone 140, the second heated zone 145, and the third heated zone 150 have reached their desired temperatures, the HCL unit 107 may determine (based upon the internal and external environmental data) that the third heater 154 requires 10 W of power; the second heater 149 requires 8 W of power; and the first heater 144 requires 5 W of power. As the total wattage required is now 23 W of power while the total dedicated power is only 20 W, the HCL unit 107 may utilize the heater driver prioritization order such that the higher priority channels are provided the required power. Thus, the HCL unit 107 may provide the required 10 W of power to the third heater 154, may provide the required 8 W of power to the second heater 149, but only provide 2 W to the first heater 144 despite its need of 5 W. It should be noted that in this scenario, the fourth heater 159 may not receive any power as the higher priority channels exhaust the total dedicated power. In this manner, the HCL unit 107 may guarantee that the power budget is not violated as well as controlling the overall power usage.

It should be noted that the HCL unit 107 may simply allocate power to the first heater 144, the second heater 149, the third heater 154, and the fourth heater 159 until the desired temperature is reached in the first heated zone 140, the second heated zone 145, the third heated zone 150, and the fourth heated zone 155, respectively. Once the desired temperature is reached for the third heated zone 150, the power may be terminated to the third heater 154 and redirected to the second heater 149 of the second heated zone 145 based upon the heater driver prioritization order. However, when the internal and external environmental data has indicated that the third heated zone 150 has deviated from its desired temperature, the HCL unit 107 may revert to directing the power back to the third heated zone 150 as this heated zone has priority over any subsequent heated zone as indicated in the heater driver prioritization order. In such an embodiment, the dedicated power for the heating system may always be utilized without consideration of whether an exceeding amount of power is required.

It should also be noted that the first sensor 142, the second sensor 147, the third sensor 152, and the fourth sensor 157 may provide other data related to the power drawn through the first channel 165, the second channel 170, the third channel 175, and the fourth channel 180, respectively. Specifically, the first sensor 142, the second sensor 147, the third sensor 152, and the fourth sensor 157 may generate data related to resistance, current, and voltage of the first channel 165, the second channel 170, the third channel 175, and the fourth channel 180, respectively. By providing this data to the HCL unit 107, the calculation of an amount of power to be provided may further be adjusted accordingly. For example, when the MU 100 is disposed in a cold environment, the channel through which the power is provided may experience a change in operation such as a change in resistance. Specifically, depending on a material used for the channel, the properties of the channel may become affected from the environment. The HCL unit 107 may determine an adjustment such that the desired power is properly provided. The other data related to the power drawn may be stored in the heater driver prioritization database in the memory arrangement 110.

As discussed above, the HCL unit 107 may provide power to the first heater 144, the second heater 149, the third heater 154, and the fourth heater 159 to reach the desired temperature of the first heated zone 140, the second heated zone 145, the third heated zone 150, and the fourth heated zone 155, respectively. The HCL unit 107 may also be configured to operate based upon a further consideration. Specifically, the HCL unit 107 may attempt to provide power to all of the first heater 144, the second heater 149, the third heater 154, and the fourth heater 159 such that all of the first heated zone 140, the second heated zone 145, the third heated zone 150, and the fourth heated zone 155 have an increase in temperature. Accordingly, the HCL unit 107 may utilize a timer. The timer may provide a predetermined amount of time that a particular heater is provided power before providing power to a subsequent heater as indicated by the heater prioritization order. Therefore, the HCL unit 107 may determine whether a target heated zone has reached its desired temperature or had its heater provided power for the predetermined amount of time. If the target heated zone has reached its desired temperature, the above described manner of providing power to subsequent heaters may be used. However, if the target heated zone has not reached its desired temperature but the timer has lapsed, the HCL unit 107 may nevertheless being providing power to the subsequent heater. Using the above described example, the third heater 154 may be provided power for the third heated zone 150. During the course of providing power to the third heater 154, the third sensor 152 may continually provide readings that the desired temperature has not been reached. The HCL unit 107 may then determine that the timer has lapsed. Thus, the HCL unit 107 may redirect power to the second heater 149 despite the third heated zone 150 not reaching its desired temperature. This configuration may be utilized particularly when the total available power is insufficient to bring a particular heated zone to its desired temperature. Therefore, instead of waiting indefinitely for the third heated zone 150 to attempt to reach the desired temperature, it may be desirable to include the capability of switching over to an adjusted power amount for the third heated zone 150 such that the second heated zone 145 may begin to be heated via the second heater 149. It is noted that although the third heated zone 150 may not reach its desired temperature, so long as the temperature of the third heated zone 150 (as measured by the third sensor 152) is above a known value (e.g., above the dew point of the immediately surrounding environment), adverse effects such as further condensation may be minimized. The HCL unit 107 may also provide an adjusted power to the third heater 154 of the third heated zone 150 after the timer has lapsed. The adjusted power may be similar to the maintenance power discussed above. However, since the third heated zone 150 has not reached its desired temperature, the adjusted power from the timer lapsing may be greater than the maintenance power which is determined from having the third heated zone 150 reach its desired temperature.

The HCL unit 107 may further consider safety limitations. The safety limitations may relate to parameters that the MU 100 is to operate in order for a user to not be adversely affected, particularly regarding a temperature of the MU 100 and its heated zones such that the user may handle the MU 100 safely. The HCL unit 107 may receive the internal environmental data from the first sensor 142, the second sensor 147, the third sensor 152, and the fourth sensor 157 in order to determine whether the safety limitations are not violated. For example, during the course of providing power, a heater, a channel, and/or the heated zone may increase in temperature to a degree where a safety limitation is exceeded (e.g., a temperature that may burn a user). When the HCL unit 107 receives data indicative of this scenario or heading toward this scenario, the HCL unit 107 may be configured to terminate the power to be drawn in order to remain within the safety limitations. The safety limitations may be stored in the memory arrangement 110.

It should be noted that FIG. 1 shows a non-heated zone 160. The non-heated zone 160 illustrates that the MU 100 may include some portion that does not include a dedicated sensor and heater. Accordingly, the non-heated zone 160 may have components therein that do not require heat management for proper operation. In another manner, the non-heated zone 160 may be in a position relative to the first heated zone 140, the second heated zone 145, the third heated zone 150, and the fourth heated zone 155 such that the non-heated zone 160 may be indirectly heated from the first heater 144, the second heater 149, the third heater 154, and/or the fourth heater 159.

Figure 2:
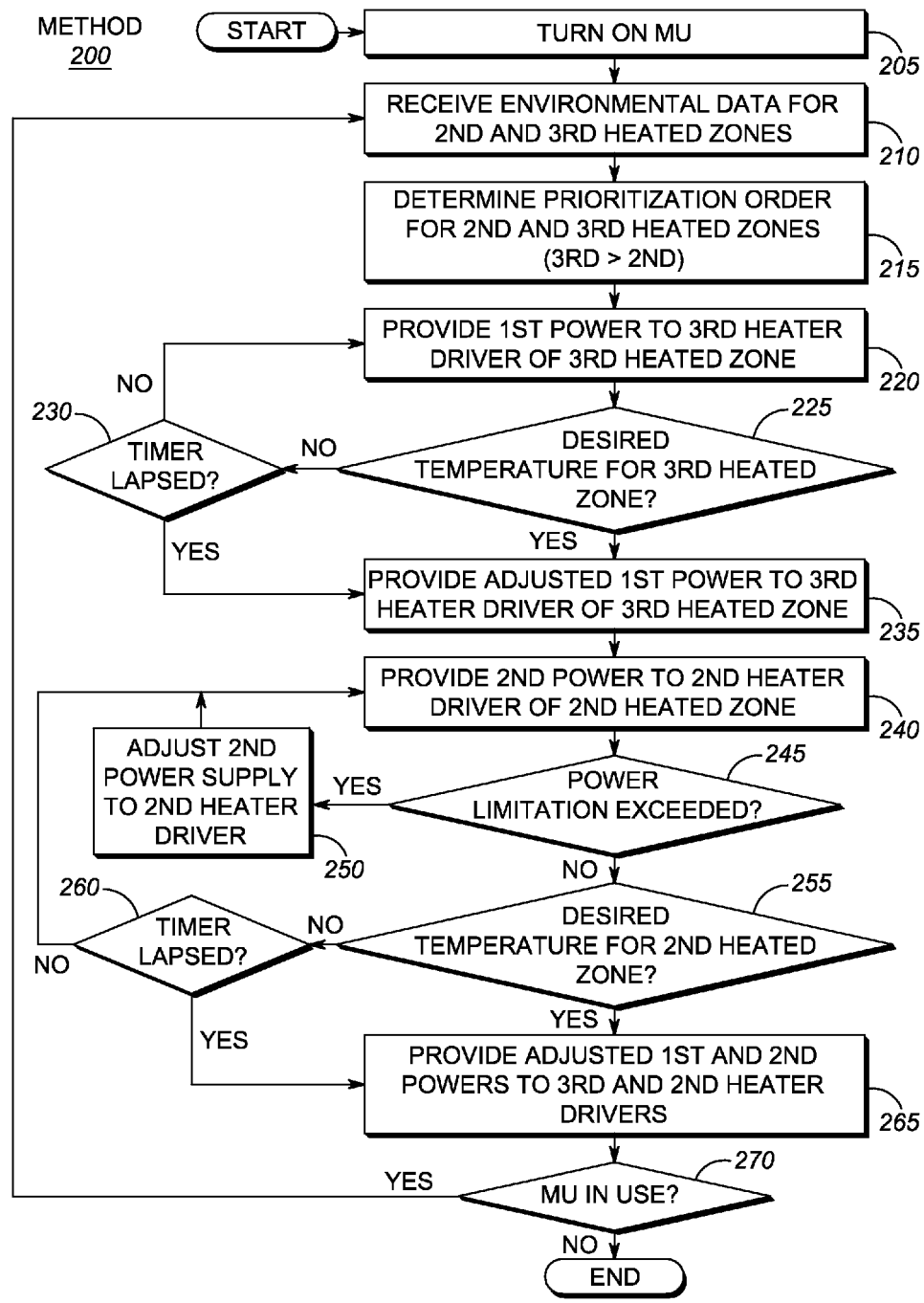
FIG. 2 illustrates a method of providing heat to zones of a mobile unit in accordance with some embodiments.

FIG. 2 illustrates a method 200 of providing heat to the heated zones of the MU 100 in accordance with some embodiments. The method 200 will be described with regard to two heated zones and the manner in which the HCL unit 107 is configured to manage the delivery of power. Specifically, the two heated zones may be the third heated zone 150 and the second heated zone 145. However, as discussed above and as those skilled in the art will understand, the method 200 may be adapted such that more than two heated zones may be considered by the HCL unit 107 such as including the first heated zone 140, the second heated zone 145, the third heated zone 150, and the fourth heated zone 155. The method 200 will be described with regard to the MU 100 of FIG. 1.

In 205, the MU 100 is turned on. For example, the MU 100 may be deactivated or awoken from a sleep state. Upon being turned on, in 210, the environmental data for the second heated zone 145 and the third heated zone 150 is received by the HCL unit 107. As discussed above, the environmental sensor 130, the second sensor 147, and the third sensor 152 may generate internal and external environmental data. The environmental sensor 130, the second sensor 147, and the third sensor 152 may be configured to automatically generate the internal and external environmental data so long as the MU 100 is turned on or may generate this data when requested.

In 215, the HCL unit 107 determines the prioritization order for providing power to the second heater 149 and the third heater 154 of the second heated zone 145 and the third heated zone 150 as a function of the internal and external environmental data. Specifically, the HCL unit 107 may reference the heater driver prioritization database and determine the heater driver prioritization order based upon the predetermined scenario as indicated by the internal and external environmental data. According to an exemplary embodiment, the third heated zone 150 may have priority over the second heated zone 145. In 220, the HCL unit 107 allocates power to the third heater 154 of the third heated zone 150.

In 225, a determination is made by the HCL unit 107 as to whether the heated zone has reached its desired temperature. As described above, the heater driver prioritization database may further include the desired temperature for each of the heated zones given the predetermined scenario that the MU 100 is currently experiencing. The environmental sensor 130 and the third sensor 152 may provide periodic updates as to the internal and external environmental data for the third heated zone 150. If the desired temperature has not been reached, the method 200 continues to 230.

In 230, the HCL unit 107 determines whether the timer has lapsed for an amount of time which the third heater 154 is provided power. If the timer has not yet lapsed, the method 200 returns to 220. However, if the timer has lapsed, the method 200 continues to 235.

Returning to 225, if the desired temperature has been reached, the method 200 continues to 235. In 235, the HCL unit 107 allocates an adjusted power to the third heater 154 depending on whether the desired temperature of the third heated zone has been reached or whether the timer has lapsed. If the desired temperature of the third heated zone 150 has been reached (as determined in 225), the adjusted power may be the maintenance power. As discussed above, the maintenance power may be a lesser amount than the power provided to first reach the desired temperature but sufficient to maintain the desired temperature which has already been reached. If the timer has lapsed, the adjusted power may be a predetermined amount of power that may be greater than the maintenance power.

In 240, the second heater 149 of the second heated zone 145 is provided power. As the second heated zone 145 has the second priority while the third heated zone 150 has the first priority, the HCL unit 107 waits for the third heated zone 150 to first reach its desired temperature or for the timer to lapse. Subsequently, the second heater 149 of the second heated zone 140 is allowed to draw power in order to raise a temperature thereof. Specifically, the adjusted power may be provided to the third heater 154 the third heated zone 150 while a remaining amount of total power may be provided to the second heater 149 of the second heated zone 145.

In 245, a determination is made by the HCL unit 107 as to whether a power limitation has been exceeded. Specifically, the determination relates to whether the dedicated power has been exceeded. Although the above description relates to providing the third heater 154 with a portion of the dedicated power while the second heater 149 is provided with a remainder of the dedicated power, a different scenario may exist where the amount of power to be provided to reach a desired temperature is used. For example, with a total dedicated power of 20 W, in order for the third heated zone 150 to maintain its desired temperature, a portion of 5 W may be required. However, the second heated zone 145 may require 17 W of power to properly reach its desired temperature (based upon the internal and external environmental data). Accordingly, the HCL unit 107 may determine that the total required power of 22 W exceeds the global power limitation. Therefore, the HCL unit 107 may reduce the power to be drawn by the second heater 149 in order for the global power limitation to not be violated. Thus, if 245 determines that the power limitation is exceeded, the method 200 continues to 250 in which the power supply to the second heater 149 is adjusted accordingly. The method 200 then returns to 240 where the second heater 149 is provided the adjusted power. As the third heated zone 150 has priority over the second heated zone 145, the maintenance of the desired temperature in the third heated zone 150 takes precedence.

Returning to 245, if the power limitation is not exceeded, the method 200 continues to 255. In 255, a determination is made by the HCL unit 107 as to whether the second heated zone 145 has reached its desired temperature. Again, the second sensor 147 may provide periodic updates in order for the HCL unit 107 to make this determination. If the second heated zone 145 has not reached its desired temperature, the method 200 continues to 260 to determine whether the timer has lapsed. If the timer has not lapsed, the method 200 returns to 240. If the second heated zone 145 has reached its desired temperature or the timer has lapsed, the method 200 continues to 265. In 265, the HCL unit 107 determines the adjusted power to the third heater 154 and the second heater 149.

In 270, a determination is made whether the MU 100 is still in use. If the MU 100 is still in use, the method 200 returns to 210. In this manner, the method 200 may continue during the duration of the MU being used for the third heated zone 150 and the second heated zone 145 to be heated accordingly.

It should be noted that the method 200 may include further operations. In a first example, as the second sensor 147 and the third sensor 152 provide updates to the internal and external environmental data, this operation may be associated with every operation of the method 200. In a second example, other data may be determined in order to properly assess the power to be provided to the second heater 149 and the third heater 154. Accordingly, after 215, 235, 240, 260, the method 200 may include an operation of determining this other data prior to providing the power to the second heater 149 and the third heater 154. In a third example, the safety limitations may be considered to further manage the power being provided to the heaters 144, 154.

The exemplary embodiments provide a heater system for a MU having a portable power supply. The heater system includes a HCL unit that manages the delivery of power through a dedicated channel of a heater in a heated zone of the MU. Through respective sensors of the heated zones, the HCL unit may receive internal and external environmental data in order to determine a heater driver prioritization order based upon a heater driver prioritization database. The HCL unit may allocate power to the heaters of the heated zones based upon this heater driver prioritization order such that a desired temperature of the heated zones are reached and maintained.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A heater management system for a mobile unit (MU), the MU including a plurality of heated zones, the heater management system comprising:
for each of the heated zones:
a heater driver controlled by a unique control channel that is configured to heat the heated zone; and
a sensor sensing environmental data external and internal to the heated zone;
a memory storing a heater driver prioritization database; and
a heater management processor programmed to:
receive periodic reports from each of the sensors;
prioritize the heated zones by utilizing the heater driver database as a function of the periodic reports; and
determine power to be provided to each of the heater drivers based on the prioritizing operation and a predetermined global power limitation;
wherein the heater driver prioritization database includes a plurality of heater driver prioritization orders, each heater driver prioritization order being associated with a predetermined condition based upon the environmental data, the heated zones being prioritized based upon the heater driver prioritization order.

2. The heater management system of claim 1, wherein the environmental data includes a temperature value and a humidity value.

3. The heater management system of claim 1, wherein the heater management processor provides the power to a first one of the heated zones, the first heated zone having a highest priority, the heater management processor being further programmed to:
determine when the first heated zone has reached a first desired temperature; and
determine a first maintenance power to the first heated zone such that the first desired temperature is maintained.

4. The heater management system of claim 3, wherein the first desired temperature is determined based upon the environmental data.

5. The heater management system of claim 3, wherein the power to the first heated zone is a portion of a total dedicated power as indicated by the global power limitation.

6. The heater management system of claim 5, wherein the heater management processor provides the power to a second one of the heated zones, the second heated zone having a lower priority than the first heated zone, the heater management processor being further programmed to:
determine when the second heated zone has reached a second desired temperature; and
determine a second maintenance power to the second heated zone such that the second desired temperature is maintained.

7. The heater management system of claim 6, wherein the global power limitation indicates that the power provided to the second heated zone is limited to a difference between the total dedicated power and the first maintenance power.

8. The heater management system of claim 7, wherein the first heated zone includes a display device and the second heated zone includes an input device.

9. The heater management system of claim 1, wherein the power is provided based on at least one predetermined safety limitation.

10. A method, comprising:
generating a heater driver prioritization database for a heater management system of a mobile unit (MU), the MU including a plurality of heated zones, each of the heated zones including a heater driver controlled by a unique control channel that is configured to heat the heated zone and a sensor sensing environmental data external and internal to the heated zone;
receiving periodic reports from each of the sensors;
prioritizing the heated zones by utilizing the heater driver database as a function of the periodic reports; and
providing power to each of the heater drivers based on the prioritizing operation and a predetermined global power limitation;
wherein the heater driver prioritization database includes a plurality of heater driver prioritization orders, each heater driver prioritization order being associated with a predetermined condition based u s on the environmental data the heated zones being prioritized based upon the heater driver prioritization order.

11. The method of claim 10, wherein the environmental data includes a temperature value and a humidity value.

12. The method of claim 10, wherein the prioritized power is provided to a first one of the heated zones, the first heated zone having a highest priority, the method further comprising:
determining when the first heated zone has reached a first desired temperature; and
determining a first maintenance power to the first heated zone such that the first desired temperature is maintained.

13. The method of claim 12, wherein the first desired temperature is determined based upon the environmental data.

14. The method of claim 12, wherein the prioritized power to the first heated zone is a portion of a total dedicated power as indicated by the global power limitation.

15. The method of claim 14, wherein the prioritized power is provided to a second one of the heated zones, the second heated zone having a lower priority than the first heated zone, the method further comprising:
determining when the second heated zone has reached a second desired temperature; and
determining a second maintenance power to the second heated zone such that the second desired temperature is maintained.

16. The method of claim 15, wherein the global power limitation indicates that the prioritized power provided to the second heated zone is limited to a difference between the total dedicated power and the first maintenance power.

17. The method of claim 10, wherein the prioritized power is provided based on at least one predetermined safety limitation.

18. A non-transitory computer readable storage medium with an executable program stored thereon, wherein the program instructs a processor to perform operations comprising:
generating a heater driver prioritization database for a heater management system of a mobile unit (MU), the mobile MU including a plurality of heated zones, each of the heated zones including a heater driver controlled by a unique control channel that is configured to heat the heated zone and a sensor sensing environmental data external and internal to the heated zone;
receiving periodic reports from each of the sensors;
prioritizing the heated zones by utilizing the heater driver database as a function of the periodic reports; and
providing power to each of the heater drivers based on the prioritizing operation and a predetermined global power limitation;

wherein the heater driver prioritization database includes a plurality of heater driver prioritization orders each heater driver prioritization order being associated with a predetermined condition based upon the environmental data, the heated zones being prioritized based upon the heater driver prioritization order.

* * * * *